United States Patent
Spicer et al.

(10) Patent No.: US 7,249,188 B2
(45) Date of Patent: *Jul. 24, 2007

(54) NETWORK RESOURCE CONTROL SYSTEM

(75) Inventors: Steven Spicer, Kitchener (CA);
Christopher Martin, Kitchener (CA);
Larry Kuhl, Waterloo (CA); Brian Hollander, Kitchener (CA); Patrick Pidduck, Waterloo (CA); Steven Coutts, Waterloo (CA); Philip Von Hatten, New Hamburg (CA); Mark Onischke, Kitchener (CA); Clayton Grassick, Winnipeg (CA); Tim Lehan, Kitchener (CA)

(73) Assignee: Spicer Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/303,015

(22) Filed: Dec. 16, 2005

(65) Prior Publication Data
US 2006/0168258 A1    Jul. 27, 2006

Related U.S. Application Data

(63) Continuation of application No. 09/926,438, filed on Jan. 18, 2002, now Pat. No. 7,007,093.

(51) Int. Cl.
*G06F 15/16* (2006.01)
*G06F 7/04* (2006.01)
(52) U.S. Cl. .............. 709/229; 726/2; 726/3; 726/21
(58) Field of Classification Search .......... 709/203, 709/217, 219, 220, 223, 225–229, 233; 726/2–4, 726/11, 12, 17, 21
See application file for complete search history.

(56) References Cited

U.S. PATENT DOCUMENTS

| | | | | |
|---|---|---|---|---|
| 5,580,177 A * | 12/1996 | Gase et al. | ............... | 400/61 |
| 5,987,611 A | 11/1999 | Freund | ............... | 713/201 |
| 6,064,656 A * | 5/2000 | Angal et al. | ............... | 370/254 |
| 6,088,451 A * | 7/2000 | He et al. | ............... | 726/8 |
| 6,161,139 A * | 12/2000 | Win et al. | ............... | 709/225 |
| 6,178,505 B1 * | 1/2001 | Schneider et al. | ............... | 713/168 |
| 6,182,142 B1 * | 1/2001 | Win et al. | ............... | 709/229 |
| 6,202,156 B1 * | 3/2001 | Kalajan | ............... | 726/11 |

(Continued)

FOREIGN PATENT DOCUMENTS

WO    WO 99/22294    5/1999

*Primary Examiner*—William Vaughn
*Assistant Examiner*—Yemane M. Gerezgiher
(74) *Attorney, Agent, or Firm*—Grant Tisdall; Gowling Lafleur Henderson LLP

(57) ABSTRACT

A network resource control system allows network terminals to communicate with network resources, and includes a resource registry, an authorization server and an administration server. The resource registry includes resource records which are associated with the network resources and define at least a user access level for each network resource. The authorization server is in communication with the resource registry and controls network access to the network resources in accordance with the resource records. The administration server is in communication with the resource registry and provides controlled access to the resource records. The administration server receives user access control data from administrators of the network resources for incorporation into the resource records. Depending upon the user access control data received, the authorization server configures the network terminals for communication with the network resources.

22 Claims, 5 Drawing Sheets

U.S. PATENT DOCUMENTS

| | | | |
|---|---|---|---|
| 6,212,565 B1 * | 4/2001 | Gupta .................. | 709/229 |
| 6,219,786 B1 * | 4/2001 | Cunningham et al. ...... | 713/152 |
| 6,226,752 B1 * | 5/2001 | Gupta et al. .................. | 726/9 |
| 6,233,618 B1 * | 5/2001 | Shannon .................. | 709/229 |
| 6,308,273 B1 * | 10/2001 | Goertzel et al. ............ | 726/9 |
| 6,317,838 B1 * | 11/2001 | Baize .................. | 726/11 |
| 6,324,648 B1 * | 11/2001 | Grantges, Jr. .............. | 726/12 |
| 6,345,300 B1 * | 2/2002 | Bakshi et al. ............ | 709/229 |
| 6,360,252 B1 | 3/2002 | Rudy .................. | 709/206 |
| 6,377,994 B1 * | 4/2002 | Ault et al. .................. | 709/229 |
| 6,408,336 B1 * | 6/2002 | Schneider et al. ........ | 709/229 |
| 6,438,585 B2 | 8/2002 | Mousseau et al. ........ | 709/206 |
| 6,453,353 B1 * | 9/2002 | Win et al. .................. | 709/229 |
| 6,463,474 B1 * | 10/2002 | Fuh et al. .................. | 709/225 |
| 6,490,624 B1 * | 12/2002 | Sampson et al. .......... | 709/227 |
| 6,510,464 B1 * | 1/2003 | Grantges et al. .......... | 709/225 |
| 6,581,092 B1 * | 6/2003 | Motoyama et al. ........ | 709/219 |
| 6,662,228 B1 * | 12/2003 | Limsico .................. | 709/225 |
| 6,681,392 B1 * | 1/2004 | Henry et al. .............. | 717/176 |
| 6,687,732 B1 * | 2/2004 | Bector et al. .............. | 709/200 |
| 6,690,481 B1 * | 2/2004 | Yeung et al. .............. | 358/1.15 |
| 6,718,328 B1 * | 4/2004 | Norris .................. | 707/9 |
| 6,728,787 B1 * | 4/2004 | Leigh .................. | 719/327 |
| 6,771,595 B1 * | 8/2004 | Gilbert et al. ............. | 370/229 |
| 6,785,728 B1 * | 8/2004 | Schneider et al. ........ | 709/229 |

* cited by examiner

NETWORK RESOURCE CONTROL SYSTEM (The contents of this application claims the benefit of U.S. application Ser. No. 09/926,438, filed Jan. 18, 2002 now U.S. Pat. No. 7,007,093 and is hereby incorporated by reference.)

FIELD OF THE INVENTION

The present invention relates to a method and system for network management system. In particular, the present invention relates to a method and system for controlling access to network resources.

BACKGROUND OF THE INVENTION

Local area networks are widely used as a mechanism for making available computer resources, such as file servers, scanners, and printers, to a multitude of computer users. It is often desirable with such networks to restrict user access to the computer resources in order to manage data traffic over the network and to prevent unauthorized use of the resources. Typically, resource access is restricted by defining access control lists for each network resource. However, as the control lists can only be defined by the network administrator, it is often difficult to manage data traffic at the resource level.

Wide area networks, such as the Internet, have evolved as a mechanism for providing distributed computer resources without regard to physical geography. Recently, the Internet Print Protocol ("IPP") has emerged as a mechanism to control access to printing resources over the Internet. However, IPP is replete with deficiencies.

First, as IPP-compliant printing devices are relatively rare, Internet printing is not readily available.

Second, although IPP allows user identification information to be transmitted to a target resource, access to IPP-compliant resources can only be changed on a per-resource basis. This limitation can be particularly troublesome if the administrator is required to change permissions for a large number of resources.

Third, users must have the correct resource driver and know the IPP address of the target resource before communicating with the resource. Therefore, if the device type or the IPP address of the target resource changes, users must update the resource driver and/or the IPP address of the resource. Also, if a user wishes to communicate with a number of different resources, the user must install and update the resource driver and IPP address for each resource as the properties of each resource changes.

Fourth, access to IPP printers cannot be obtained without the resource administrator locating the resource outside the enterprise firewall, or without opening an access port through the enterprise firewall. Whereas the latter solution provides the resource administrator with the limited ability to restrict resource access, the necessity of opening an access port in the enterprise firewall exposes the enterprise network to the possibility of security breaches.

Consequently, there remains a need for a network resource control solution which allows resource owners to easily and quickly control resource access, which is not hindered by changes in device type and resource network address, which facilitates simultaneous communication with a number of target resources, and which does not expose the enterprise network to a significant possibility of security breaches.

SUMMARY OF THE INVENTION

According to the invention, there is provided a network resource control system and a method of network resource control which addresses at least one deficiency of the prior art network resource control systems.

The network resource control system, according to the present invention, allows network users to communicate with network resources, and comprises a resource registry, an authorization server and an administration server. The resource registry includes resource records which are associated with the network resources and define at least a user access level for each network resource. The authorization server is in communication with the resource registry and controls network access to the network resources in accordance with the resource records. The administration server is in communication with the resource registry and provides controlled access to the resource records.

The network resource control method, according to the present invention, facilitates communication between network users and network resources, and comprises the steps of (1) providing a resource registry including resource records associated with the network resources, the resource records including user access control data; (2) receiving user access control data from administrators of the network resources for incorporation into the resource records; and (3) in accordance with the user access control data, configuring the network terminals for communication with the network resources.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
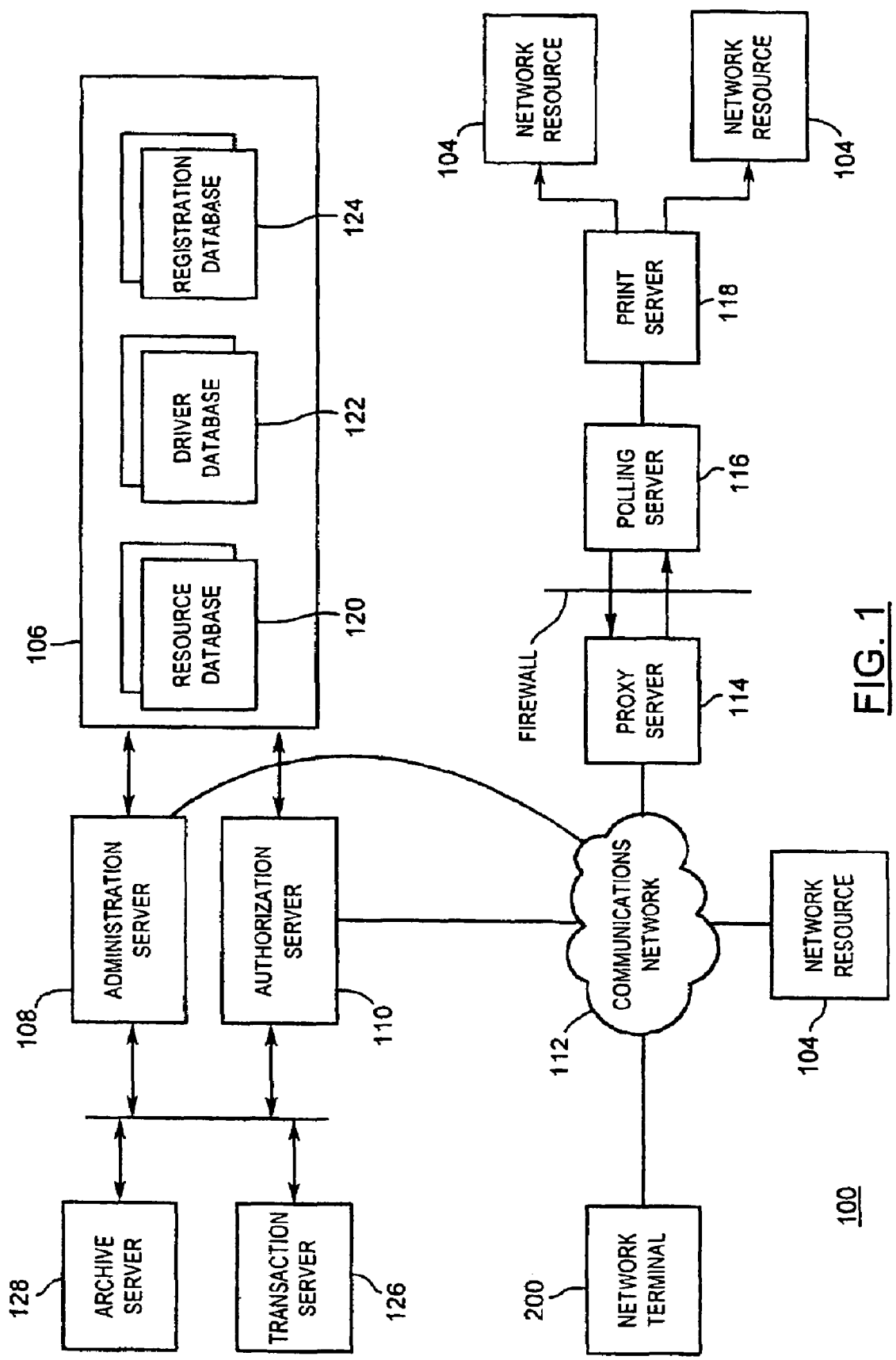
FIG. 1 is a schematic view of the network resource control system, according to the present invention, showing the network terminals, the network resources, the resource registry, the authorization server, the administration server, the proxy server, and the polling server.

Turning to FIG. 1, a network resource control system, denoted generally as 100, is shown comprising a network terminal 200, a network resource 104, a resource registry 106, an administration server 108, and an authorization server 110. Typically, the network resource control system 100 comprises a plurality of network terminal 200, and a plurality of network resources 104, however for enhanced clarity of discussion, FIG. 1 only shows a single network terminal 200 and a single network resource 104.

The network resource control system 100 also includes a communications network 112 facilitating communication between the network terminals 200, the network resources 104, the administration server 108, and the authorization server 110. Preferably, the communications network 112 comprises a wide area network such as the Internet, however the network 112 may also-comprise a local area network. Further, the network 112 need not be a land-based network, but instead may comprise a wireless network and/or a hybrid of a land-based network and a wireless network for enhanced communications flexibility.

Each network terminal 200 typically comprises a land-based network-enabled personal computer. However, the invention is not limited for use with personal computers. For instance, one or more of the network terminals 200 may comprise a wireless communications device, such as a wireless-enabled personal data assistant, or e-mail-enabled wireless telephone if the network 112 is configured to facilitate wireless data communication. In addition, the invention is not limited to only facilitating transmission of text data, but instead may be used to transmit image data, audio data or multimedia data, if desired.

Figure 2:
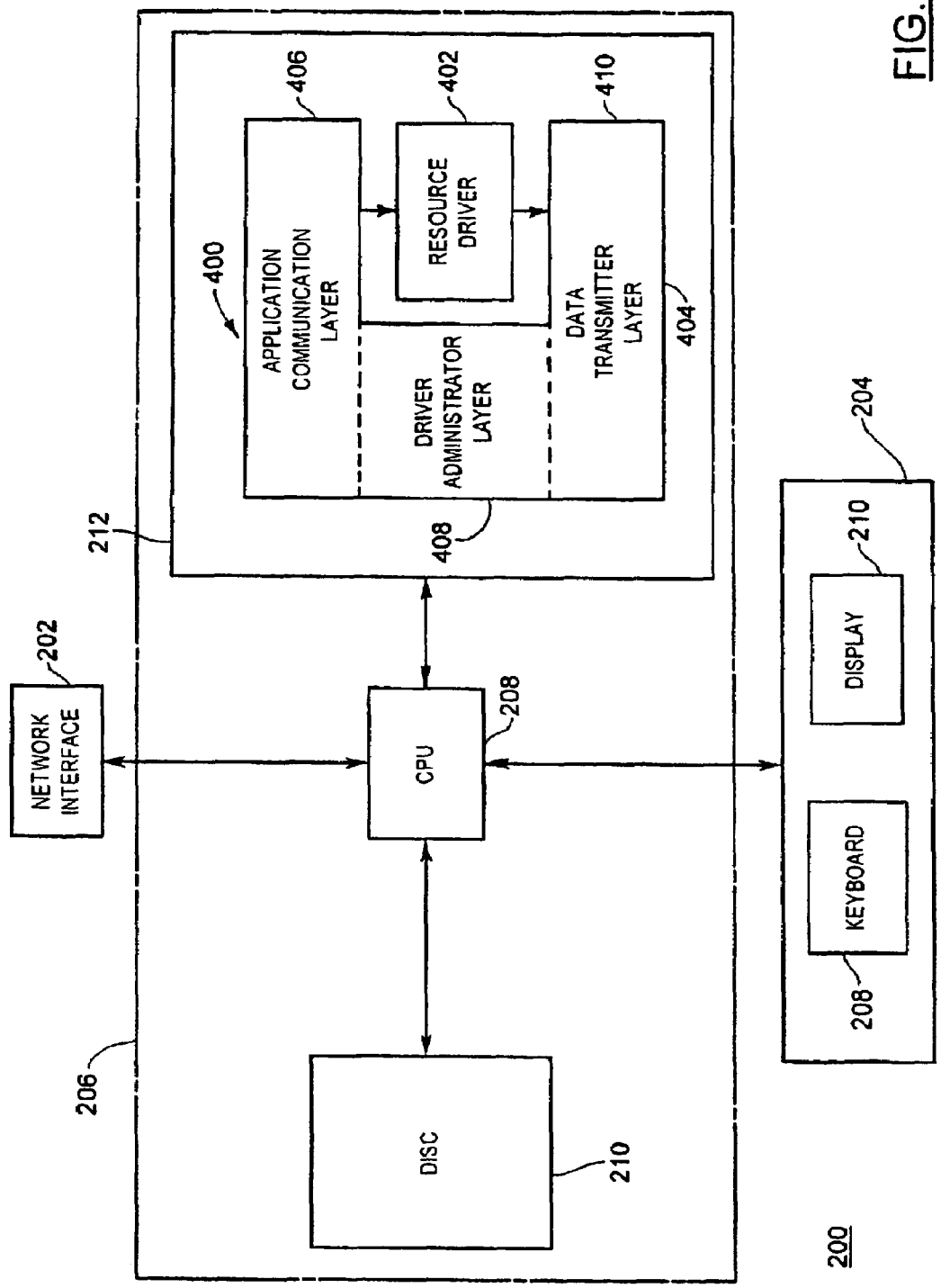
FIG. 2 is a schematic view one of the network terminals depicted in FIG. 1, showing the driver application for use with the present invention.

As shown in FIG. 2, the network terminal 200 comprises a network interface 202, a user interface 204, and a data processing system 206 in communication with the network interface 202 and the user interface 204. Typically, the network interface 202 comprises an Ethernet network circuit card, however the network interface 202 may also comprise an RF antenna for wireless communication over the communications network 112. Preferably, the user interface 204 comprises a data entry device 208 (such as keyboard, microphone or writing tablet), and a display device 210 (such as a CRT or LCD display).

The data processing system 206 includes a central processing unit (CPU) 208, and a non-volatile memory storage device (DISC) 210 (such as a magnetic disc memory or electronic memory) and a read/write memory (RAM) 212 both in communication with the CPU 208. The DISC 210 includes data which, when loaded into the RAM 212, comprise processor instructions for the CPU 208 which define memory objects for allowing the network terminal 200 to communicate with the network resources 104 and the authorization server 110 over the communications network 112. The network terminal 200, and the processor instructions for the CPU 208 will be discussed in greater detail below.

Typically, each network resource 104 comprises a printing device, and in particular, an IPP-compliant printer. However, the invention is not limited for use with networked printers (IPP-compliant or otherwise), but instead can be used to provide access to any of a variety of data communication devices, including facsimile machines, image servers and file servers. Further, the invention is not limited for use with land-based data communications devices, but instead can be used to provide access to wireless communications devices. For instance, the network resource control system 100 can be configured to facilitate data communication with e-mail pagers or e-mail enabled wireless telephones.

It is expected that some of the network resources 104 may be located behind an enterprise firewall. Accordingly, to facilitate communication between network terminals 200 and firewall-protected network resources 104, the network resource control system 100 may also include a proxy server 114 located logically outside the enterprise firewall, and a polling server 116 located logically within the firewall, as shown in FIG. 1. Preferably, the proxy server 114 is located on-site at the enterprise responsible for administering the network resource 104, is provided with a network address corresponding to the enterprise, and includes a queue for receiving application data. However, the proxy server 114 may also be located off-site, and may be integrated with the authorization server 110 if desired. This latter option is advantageous since it allows system administrators to provide access to network resources 104, but without having to incur the expense of the domain name registration and server infrastructure.

In addition to the proxy server 114 and the polling server 116, preferably the enterprise includes an enterprise server 118 (eg. a print server) to facilitate communication with the network resources 104 located behind the firewall. The polling server 116 is in communication with the enterprise server 118, and is configured to periodically poll the proxy server 114 through the firewall to determine whether application data from a network terminal 200 is waiting in the queue of the proxy server 114. The proxy server 114 is configured to transmit any queued application data to the polling server 116 in response to the poll signal from the polling server 116. Upon receipt of the queued application data from the proxy server 114, the polling server 116 transmits the application to the enterprise server 118 for distribution to the appropriate network resource 104. As will be apparent, this mechanism allows application data to be transmitted to network resources 104 located behind a firewall, but without exposing the enterprise to the significant possibility of security breaches associated with firewall access ports.

Figure 3:
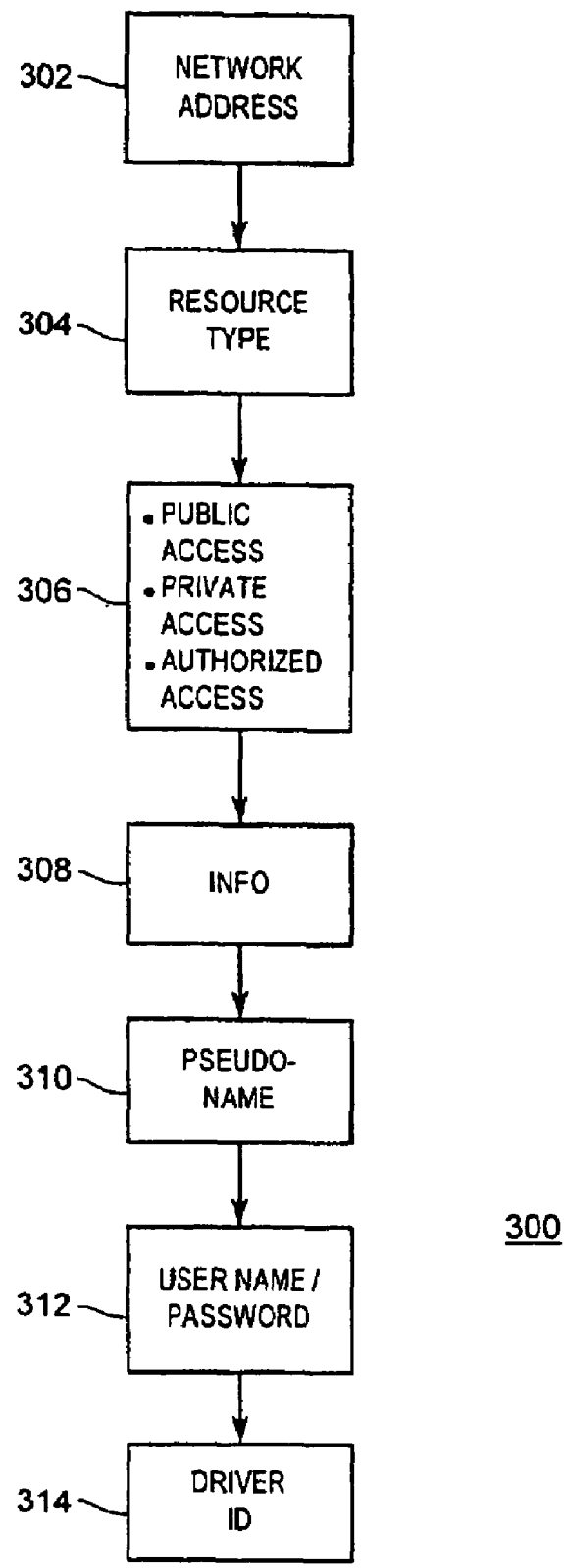
FIG. 3 is a schematic view of the format of the resource records comprising the resource database of the resource registry depicted in FIG. 1, showing the network address field, the resource type field, the user access level field, the resource information field, the pseudo-name field, the user-name/password field, and the driver identification field.

The resource registry 106 comprises a resource database 120, a driver database 122, and a user registration database 124. The resource database 120 includes resource records 300 identifying parameters associated with the network resources 104. As shown in FIG. 3, each resource record 300 comprises a network address field 302, a resource type field 304, and a user access level field 306 for the associated network resource 104. The network address field 302 identifies the network address of the network resource 104. As discussed above, typically each network resource 104 comprises an IPP-compliant printer, in which case the network address field 302 identifies comprises the network resource IPP address. However, in the case where the network resource 104 comprises a non-IPP-compliant device and the communications network 112 comprises the Internet, preferably the network resource 104 is linked to the communications network 112 via a suitable server, and the network address field 302 for the network resource 104 identifies the Internet Protocol ("IP") address of the server.

The resource type field 304 identifies the type of data communication device of the network resource 104. For instance, the resource type field 304 may specify that the network resource 104 is a printer, an image server, a file server, an e-mail pager, or an e-mail enabled wireless telephone. Further, the resource type field 304 may include a resource type sub-field specifying a sub-class of the network resource type. For example, the resource type sub-field may specify that the network resource 104 is an IPP-capable printer, or a non-IPP-capable printer.

The user access level field 306 identifies the type of communications access which the network terminals 200 are allowed to have in regards to the associated network resource 104. In the embodiment, as presently envisaged, the user access level field 306 establishes that the network resource 104 allows one of:

(a) "public access" in which any network terminal 200 of the network resource control system 100 can communicate with the network resource 104;

(b) "private access" in which only members (eg. employees) of the enterprise associated with the network resource 104 can communicate with the network resource 104; and (c) "authorized access" in which only particular network terminals 200 can communicate with the network resource 104.

If the user access level field 306 specifies "authorized access" for a network resource 104, preferably the user access level field 306 includes a sub-field which lists the names of the network terminals 200 authorized to access the network resource 104, and a sub-field which includes an authorization password which the identified network terminals 200 must provide in order to access the network resource 104. If the user access level field 306 specifies "private access" for a network resource 104, preferably the user access level field 306 includes a sub-field which lists the network address of the network terminals 200 which are deemed to members of the enterprise.

It should be understood, however, that the user access level field 306 is not limited to identifying only the foregoing predefined user access levels, but may instead identify more than one of the predefined user access levels, or other user access levels altogether. For instance, the user access level field 306 may identify that the associated network resource 104 allows both private access to all employees of the enterprise running the network resource 104, and authorized access to other pre-identified network terminals 200. Further, the user access level field 306 may also include one or more sub-fields (not shown) which provide additional restrictions/permissions on the type of communications access which the network terminals 200 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record 300 includes an information field 308 which provides information on the network resource 104, such as data handling capabilities, resource pricing and geographical co-ordinates. This latter parameter is particularly advantageous for use with mobile network terminals 200, such as a wireless-enabled personal data assistant or an e-mail-enabled wireless telephone, since it allows the network terminal 200 to identify the nearest one of a plurality of available network resources 104. This aspect of the invention will be explained in greater detail below.

Each resource record 300 also includes a pseudo-name field 310, a username/password field 312 and a network driver identifier field 314. The pseudo-name field 310 contains a resource pseudo-name which identifies the network resource 104 to the network terminals 200. Preferably, the pseudo-name is a network alias that identifies the physical location and properties of the network resource 104, but does not identify the network address of the resource 104. Further, preferably each pseudo-name uniquely identifies one of the network resources 104, however a group of the network resources 104 may be defined with a common pseudo-name to allow communication with a group of network resources 104. This latter feature is particularly advantageous since it allows the administrator of an enterprise associated with the group of network resources to dynamically allocate each network resource 104 of the group as the demands for the network resources 104 or maintenance schedules require.

In addition, preferably the resource record 300 includes a plurality of the pseudo-name fields 310 to allow the administrator of the associated network resource 104 to update the name assigned to the network resource 104, while also retaining one or more previous pseudo-names assigned to the network resource 104. As will be explained, this feature is advantageous since it allows the administrator to update a resource name without the risk that network terminals 200 using a prior pseudo-name will be unable to locate or communicate with the network resource 104.

The username/password field 312 contains a unique username and password combination which allows the administrator of the associated network resource 104 to prevent authorized access and alteration to the data contained in the resource record 300. Preferably, each resource record 300 also includes an e-mail address field (not shown) which the network resource control system 100 uses to provide the administrator of the associated network resource 104 with a notification e-mail message when a message is successfully transmitted to the network resource 104.

The driver identifier field 314 contains a resource driver identifier which is used in conjunction with the driver database 122 to provide the network terminals 200 with the appropriate resource driver for communication with the network resource 104. The driver database 122 includes resource drivers which allow software applications installed on the network terminals 200 to communicate with the network resources 104. As will be explained below, in order for a network terminal 200 to communicate with a selected network resource 104, the network terminal 200 first downloads a driver application data from the administration server 108 over the communications network 112. The network terminal 200 may also download the appropriate resource driver from the driver database 122 (via the authorization server 110 over the communications network 112), and then allow the authorization server 110 to configure the downloaded resource driver in accordance with the access level field 306 of the resource record 300 associated with the selected network resource 104. Preferably, each resource driver includes a resource driver identifier which allows the authorization server 110 to identify the resource driver which the network terminal 200 has downloaded.

The driver application will now be discussed in association with FIG. 2. As discussed above, the DISC 210 of the network terminal 200 includes data which, when loaded into the RAM 212 of the network terminal 200, comprise processor instructions for the CPU 208. As shown, the downloaded driver application data defines in the RAM 212 a memory object comprising a driver application 400. The driver application 400 includes a generic resource driver 402 and a wrap-around resource driver layer 404. The generic resource driver 402 allows the network terminal 200 to communicate with a variety of different network resources 104, however the generic resource driver 402 typically will not provide the network terminal 200 with access to all the features and capabilities of any particular network resource 104. If the network terminal 200 requires additional features not implemented with the generic resource driver 402, the appropriate resource driver may be downloaded from the driver database 116, as mentioned above.

The wrap-around driver layer 404 includes an application communication layer 406, a driver administrator layer 408, and a data transmitter layer 410. The application communication layer 406 is in communication with the resource driver 402 (generic or network resource specific) and the application software installed on the network terminal 200, and is configured to transmit user application data between the application software and the resource driver 402. The driver administrator layer 408 communicates with the resource registry 106 over the communications network 112 to ensure that the driver application 400 is properly configured for communication with the selected network resource 104. The data transmitter layer 410 is in communication with the resource driver 402 and is configured to transmit the data output from the resource driver 402 over the communications network 112 to the selected network resource 104, via the network interface 202. Although the driver application 400 and its constituent component layers are preferably implemented as memory objects or a memory module in the RAM 212, it will be apparent that the driver application 400 may instead be implemented in electronic hardware, if desired.

Returning to FIG. 1, the registration database 124 of the resource registry 106 includes user records each uniquely associated with a user of a respective network terminal 200 upon registration with the network resource control system 100. Each user record identifies the name the registered user's name, post office address and e-mail address. In addition, each user record specifies a unique password which the registered user must specify in order to update the user's user record, and to obtain access to network resources 104 configured for "authorized access". The user record may also include additional information specifying default options for the network resource control system 100. For instance, the user may specify that the network resource control system 100 should provide the user with an acknowledgement e-mail message when a message is successfully transmitted to a selected network resource 104. The user may also specify an archive period for which the network resource control system 100 should archive the message transmitted to the selected network resource 104. This latter option is advantageous since it allows the user to easily transmit the same message to multiple network resources 104 at different times, and to periodically review transmission dates and times for each archive message.

The administration server 108 is in communication with the resource database 120 and the registration database 124. The administration server 108 provides administrators of the network resources 104 with access to the records of the resource database 120 to allow the administrators to update the network address field 302, the resource type field 304, the user access level field 306, the resource information field 308, the pseudo-name field 310, the username/password field 312 and/or the driver identifier field 314 of the resource record 300 for the associated network resource 104. As will become apparent, this mechanism allows network administrators to change, for example, the network address and/or the restrictions/permissions of the network resources 104 under their control, or even the network resource 104 itself, without having to notify each network terminal 200 of the change. The administration server 108 also provides controlled access to the registration database 124 so that only the user of the network terminal 200 which established the user record can update the user record.

Where the username/password field 312 has been completed, the administration server 108 is configured to block access to the resource record 300 until the administrator provides the administration server 108 with the correct username/password key. This feature allows the resource administrator to make adjustments, for example, to pricing and page limit, in response to demand for the network resources 104, and to make adjustments to the restrictions/permissions set out in the user access level field 306 and the resource information field 308 and thereby thwart unauthorized access to the network resources 104.

The authorization server 110 is in communication with the resource database 120 and the driver database 122 for providing the network terminals 200 with the resource drivers 402 appropriate for the selected network resources 104. Preferably, the authorization server 110 is also configured to configure the driver application 400 for communication with the selected network resource 104, by transmitting the network address of the selected network resource 110 to the data transmitter layer 410 over a communications channel secure from the user of the network terminal 200 so that the network address of the network resource 104 is concealed from the user of the network terminal 200. In the case where the communications network 112 comprises the Internet, preferably the secure communications channel is established using the Secure Sockets Layer ("SSL") protocol.

In addition to the network terminal 200, the network resource 104, the resource registry 106, the administration server 108, the authorization server 110, and the communications network 112, preferably the network resource control system 100 also includes a transaction server 126 and an archive server 128. The transaction server 126 is in communication with the authorization server 10 for keeping track of each data transfer between a network terminal 200 and a network resource 104. For each transmission, preferably the transaction server 126 maintains a transmission record identifying the network terminal 200 which originated the transmission, the network resource 104 which received the transmission, and the date, time and byte size of the transmission.

The archive server 128 is configured to retain copies of the data transmitted, for a specified period. As discussed above, the user of a network terminal 200 specifies the requisite archive period (if any) for the data transmission, upon registration with the network resource control system 100. Preferably, the administration server 108 provides controlled access to the transaction server 126 and the archive server 128 so that only the user of the network terminal 200 which originated transmission of the data is allowed access to the transmission record associated with the transmission.

Figure 4A:
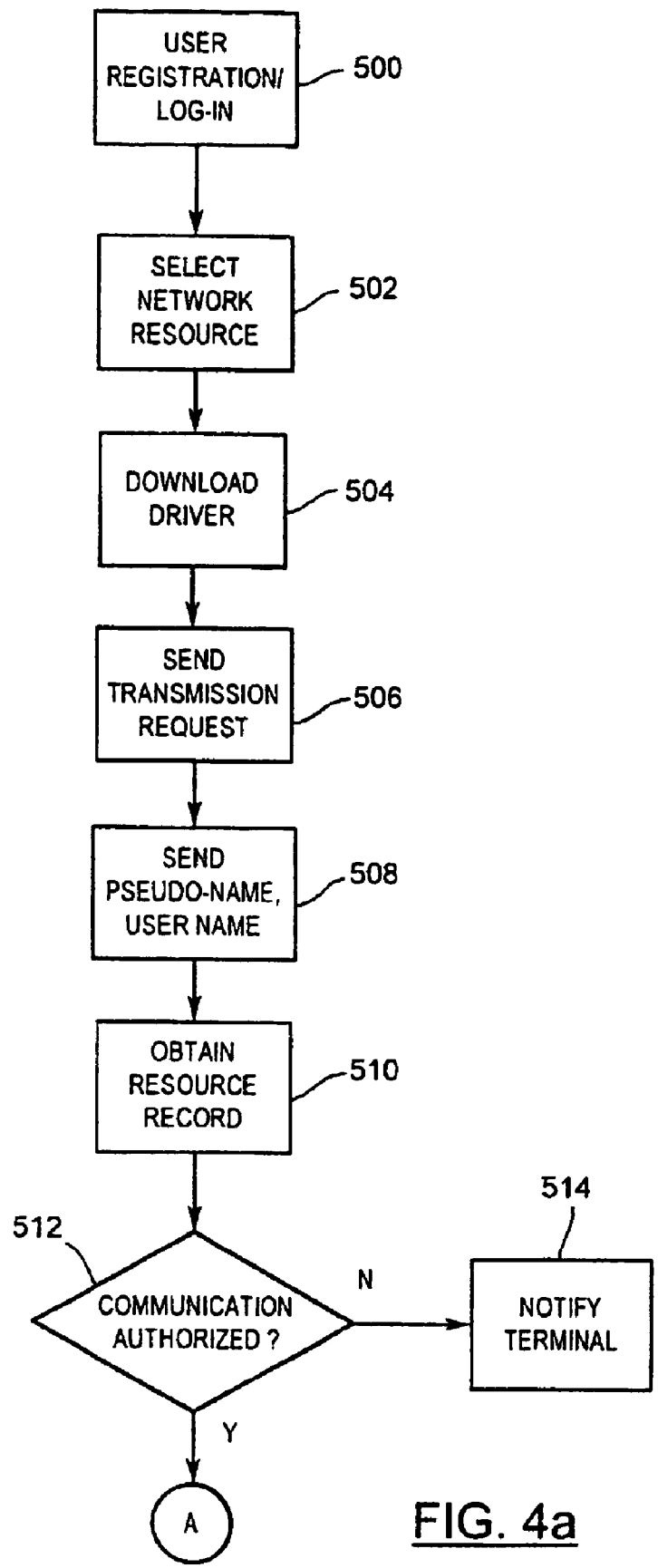
FIG. 4 is a flow chart depicting the method of operation of the network resource control system.
Figure 4B:
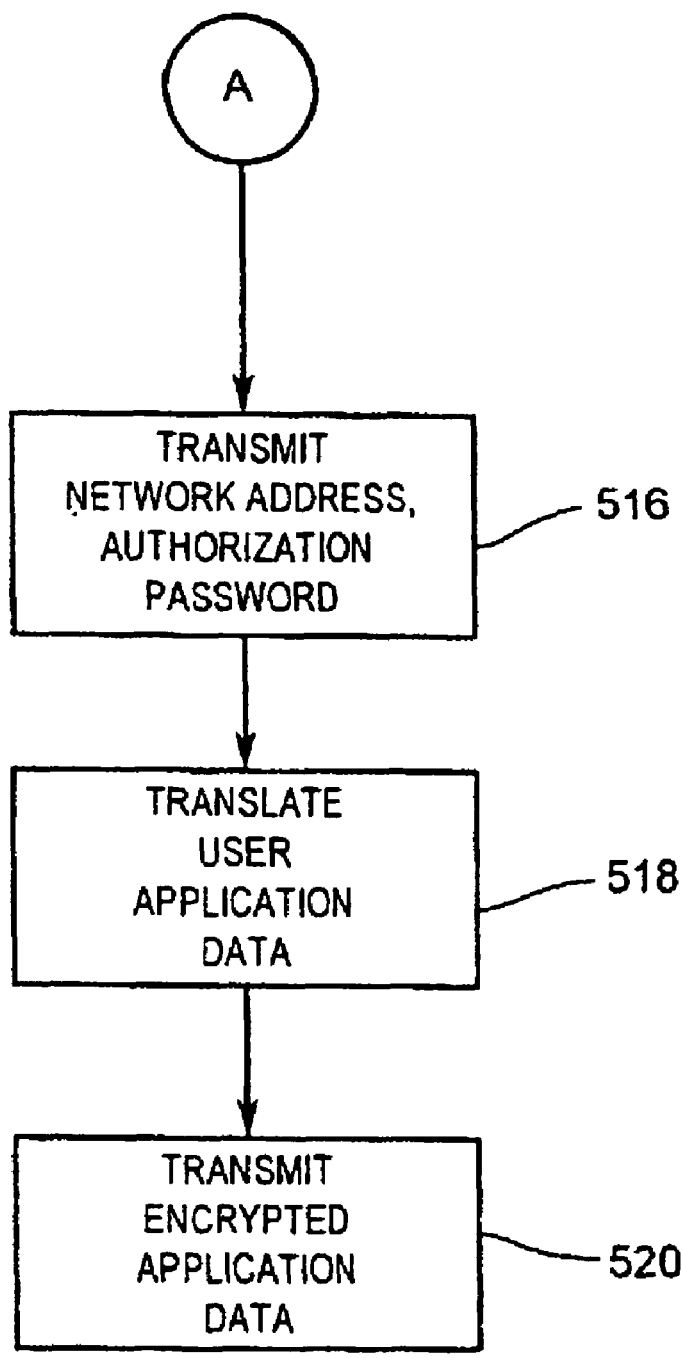

The process by which a user of a network terminal 200 can communicate with a network resource 104 will now described with reference to FIG. 4. The following discussion presupposes that the user of the network terminal 200 has downloaded the driver application 400 from the administration server 108 over the communications network 112. At step 500, the user of a network terminal 200 decides whether to log in to the network resource control system 100. As discussed above, if the user registers with the network resource control system 100 and subsequently logs in to the network resource control system 100 (by providing the authorization server 106 with the user's assigned password), the user will have access to any network resources 104 which have "authorized access" as the user access level and which have identified the registered user as a user authorized to access the network resource 104. If the user does not register or fails to log in to the network resource control system 100, the user will only have access to network resources 104 which have established "public access" as the user access level.

At step 502, the user selects a network resource 104 by querying the administration server 108 for a list of available network resources 104. Alternately, the user may postpone selection of a network resource 104 until initiation of the transmission command. The network user query may be based upon any desired criteria, including print turn-around time and page size (where the target network resource 104 is a printer), price, and geography. In addition, the user may provide the administration server 108 with the geographical coordinates of the user to determine the user's nearest network resources. The user may provide its geographical coordinates through any suitable mechanism known to those skilled in the art, including, latitude/longitude coordinates, GPS, and wireless triangulation.

If the user requested a list of available network resources 104, the user is provided with a list of pseudo-names associated with each network resource 104 satisfying the designated search criteria. As discussed above, if the user logged in to the network resource control system 100, the pseudo-name list will include both "public access" network resources 104 and "authorized access" network resources 104 with which the user has been authorized to communicate. Also, if the user is member of an enterprise having network resources 104 registered with the network resource control system 100, the pseudo-name list will also identify network resources 104 which have been registered by the enterprise for "private access". Otherwise, the pseudo-name list will only identify network resources 104 registered for public access. Upon receipt of the resource list, the user selects a network resource 104 from the list.

At step 504, the administration server 108 queries the network user's network terminal 200 for the resource driver identifier of the resource driver 402 configured on the network terminal 200, and then compares the retrieved resource driver identifier against the resource driver identifier specified in the network driver identifier field 314 of the resource record 300 associated with the selected network resource 104 to determine whether the driver application 400 has been configured with the appropriate resource driver 402 for communication with the network resource 104. If the network terminal 200 has not been configured with the appropriate resource driver 402, the administration server 108 prompts the user's network terminal 200 to download the necessary resource driver 402. As will be apparent, the downloaded resource driver 402 becomes part of the driver application 400.

When the user of the network terminal 200 is ready to communicate with the selected network resource 104, the user of the network terminal 200 transmits a transmission request via its application software to the driver application 400, at step 506. If the user did not select a network resource 104 at step 502, the application communication layer 406 of the driver application 400 contacts the administration server 108 over the communications network 112 and prompts the user to select a network resource 104, as described above. Once a network resource 104 is selected, and the appropriate resource driver 402 is installed, the application communication layer 406 notifies the driver administrator layer 408 of the transmission request.

At step 508, the driver administrator layer 408 provides the authorization server 110 with the transmission request and identifies the selected network resource 104, by transmitting to the authorization server 110 the pseudo-name assigned to the selected network resource 104. If the user of the network terminal 200 has registered and logged in to the network resource control system 100, the driver administrator layer 408 also provides the authorization server 110 with the registered user's name.

The authorization server 110 then queries the resource database 120 with the received pseudo-name for the resource record 300 associated with the pseudo-name, at step 510. The authorization server 110 then extracts the user access level from the user access level field 306 of the retrieved resource record 300, and determines whether the network terminal 200 is authorized to communicate with the selected network resource 104, at step 512. As will be apparent from the foregoing discussion, if the user access level field 306 specifies "public access" for the network resource 104, the network terminal 200 will be automatically authorized to communicate with the network resource 104.

However, if the user access level field 306 specifies "private access" for the network resource 104, the authorization server 110 determines the network address of the network terminal 200 from the transmission request transmitted by the network terminal 200, and then queries the user access level sub-field with the terminal's network address to determine whether the network terminal 200 is authorized to communicate with the network resource 104. In the case where the communications network 112 comprises the Internet, the authorization server 110 can determine the network terminal's network address from the IP packets received from the network terminal 200. On the other hand, if the user access level field 306 specifies "authorized access" for the network resource 104, the authorization server 110 queries the user access level sub-field with the user's name to determine whether the network terminal 200 is authorized to communicate with the network resource 104.

If the query at step 512 reveals that the network terminal 200 is not authorized to communicate with the network resource 104, at step 514 the authorization server 110 provides the network terminal 200 with a notification that the network terminal 200 is not authorized for communication with the selected resource 104. However, if the query at step 512 reveals that the network terminal 200 is authorized to communicate with the network resource 104, the authorization server 110 queries the network address field 302 of the resource record 300 associated with the network resource 104 for the network address of the network resource 104. The authorization server 110 then establishes a secure communications channel with the driver administrator layer 408, and then transmits the network address to the driver administrator layer 408 over the secure communications channel, at step 516.

Also, if the user access level field 306 specifies "authorized access" for the network resource 104, and the network terminal 200 is authorized to communicate with the network resource 104, the authorization server 110 queries the user access level sub-field for the authorization password assigned to the network resource 104, and then transmits the authorization password to the driver administrator layer 408 over the secure communications channel, together with the network address. In the case where the communications network 112 comprises the Internet, preferably the authorization server 110 establishes the secure communications channel using a Secure Sockets Layer ("SSL") protocol. Since the network address and the authorization password are transmitted over a secure communications channel, this information is concealed from the user of the network terminal 200.

Preferably, the authorization server 110 also extracts the resource driver identifier from the resource identifier field 314 of the resource record 300, and determines whether the network terminal 200 is still properly configured for communication with the network resource 14. If the network terminal 200 no longer has the correct resource driver 402, the authorization server 110 queries the driver database 122 for the correct resource driver 402, and prompts the user of the network terminal 200 to download the correct resource driver 402. This driver configuration verification step may be performed concurrently or consecutively with the network address providing step described in the preceding paragraph.

In addition, the administration server 108 queries the registration database 124 to determine whether the user of the network terminal 200 registered with the network resource control system 100. If the user registered with the network resource control system 100 and specified that the archive server 128 should maintain archival copies of data transmissions, the administration server 108 transmits the network address of the archive server 128 to the driver administrator layer 408. As a result, when the user of the network terminal 200 issues a data transmission command, the driver application 400 will transmit the user application data to the selected network resource 104 and to the archive server 128.

At step 518, the application communication layer 406 passes the application data received from the application software to the resource driver 402 for translation into a format suitable for processing by the selected network resource 104. Meanwhile, the driver administrator layer 408 interrogates the network resource 104, using the received network address, to determine whether the network resource 104 still resides at the specified network address, is operational and is online.

If the interrogated network resource 104 resides at the specified network address, is operational and is on-line. online, the resource driver 202 passes the translated application data to the data transmitter layer 410 of the driver application 400. Preferably, the data transmitter layer 410 compresses and encrypts the translated application data upon receipt. The data transmitter layer 410 also receives the network address of the network resource 104 from the driver administrator layer 408, adds the network address data to the compressed, encrypted data, and then transmits the resulting data over the communications network 112 to the network resource 104 at the specified network address, at step 520.

Preferably, the data transmitter layer 410 also transmits details of the transmission to the transaction server 126, such as the selected network resource 104 and the byte size of the transmission. Upon receipt of the transmission details, preferably the administration server 108 queries the resource database 120 and the user registration database 124 for the e-mail address of the resource administrator and the e-mail address of the user of the network terminal 200, if provided, and then transmits an email message indicating completion of the transmission.

If the user access level field 306 specifies "authorized access" for the network resource 104, the data transmitter layer 410 also-receives the authorization password for the network resource 104 from the driver administrator layer 408, and transmits the authorization password (as part of the compressed, encrypted data) to the network resource 104.

If the user access level field 306 specifies "public access" for the network resource 104, preferably the network resource 104 is accessible through a local server which serves to queue, decrypt and decompress the application data, and extract the network address data, and then transmit the decompressed application data to the appropriate network resource 104. Alternately, the network resource 104 itself may be configured for direct communication over the communications network 112, such as an IPP-capable printer, so that the network resource 104 is able to process the application data directly.

If the user access level field 306 specifies "authorized access" for the network resource 104, preferably the network resource 104 is accessible through a local server which serves to queue, decrypt and decompress the application data, and extract the network address data and authorization password, and then transmit the application data to the appropriate network resource 104 if the received authorization password is valid.

If the user access level field 306 specifies "private access" for the network resource 104, typically the network resource 104 will be located behind a firewall. Accordingly, the proxy server 114 associated with the network resource 104 will receive the application data, and transfer the application data to the proxy server queue. The polling server 116 associated with the network resource 104 will poll the proxy server 114 to determine the status of the queue. Upon receipt of a polling signal from the polling server 116, the proxy server 114 transmits any queued application data from the proxy server queue, through the firewall, to the polling server 116. The polling server 116 then extracts the network address from the received application data, and transmits the application data to the appropriate server 118 or network resource 104 for processing.

As will be apparent from the foregoing discussion, regardless of the user class defined for a network resource 104, if a resource administrator relocates a network resource 104 to another network address, and/or changes the device type and/or restrictions/permissions associated with the network resource 104, the resource administrator need only update the resource record 300 associated with the network resource 104 to continue communication with the network resource 104. Subsequently, when a user attempts communication with the network resource 104 using the original pseudo-name, the authorization server 110 will provide the administrator layer 408 with the updated network address of the network resource 104, or prompt the user to download the appropriate resource driver 402, assuming that the network terminal 200 is still authorized to communicate with the network resource 104.

Further, if the user access level field 306 specifies "authorized access" for the network resource 104 and the resource administrator desires to change the pseudo-name and authorization password associated with the network resource 104, the resource administrator need only update the pseudo-name and authorization password provided on the resource record 300. Subsequently, when a user of a network terminal 200 initiates communication with the network resource 104 using the original pseudo-name, the authorization server 110 scans the resource records 300 for occurrences of the original pseudo-name. After locating the appropriate resource record 300, the authorization server 110 provides the driver administrator layer 408 with the updated pseudo-name and authorization password of the network resource 104, provided that the network terminal 200 is still authorized to communicate with the network resource 104. A network terminal 200 which is not authorized to communicate with the network resource 104 will not receive the updated pseudo-name and authorization password from the authorization server 110 and, consequently, will not be able to communicate with the network resource 104, even if the user of the network terminal 200 knew the network address for the network resource 104.

The foregoing description is intended to be illustrative of the preferred embodiment of the present invention. Those of ordinary skill may envisage certain additions, deletions and/or modifications to the described embodiment which, although not explicitly described herein, are encompassed by the spirit or scope of the invention, as defined by the claims appended hereto.

We claim:

1. A print control system for facilitating communication of a data package via a polling server between a network terminal and a network printing device over a network, the data package configured for authorized data processing by the network printing device, the print control system comprising:
   a resource registry including resource records associated with the network printing device, the resource records defining at least a user access level for each said network printing device;
   a polling server configured for obtaining the data package from a proxy server across a firewall in response to a poll request to the proxy server, the data package including print data for processing by the network printing device, an authorization password associated with the network printing device and the print data, and a destination address for directing the data package over the network, the polling server further including an input interface for receiving the data package, an extraction module for extracting the destination address from the data package, and an output interface for communicating at least the print data and the authorization password to the destination address such that the authorization password is configured for controlling access to the print data by the printing device; and
   an administration server in communication with the resource registry for providing controlled access to the resource records.

2. A print control system for facilitating communication of a data package via a polling server between a network terminal and a network printing device over a network, the data package configured for authorized data processing by the network printing device, the system comprising:
   a resource registry including resource records associated with the network printing device, the resource records defining at least a user access level for each said network printing device;
   a polling server configured for obtaining the data package from a proxy server across a firewall in response to a poll request to the proxy server, the polling server comprising:
      an input interlace for receiving the data package, the data package including print data for processing by the network printing device, an authorization password associated with the network printing device and the print data, and a destination address for directing the data package over the network, the authorization password for allowing access of the print data by the network printing device;
      an extraction module for extracting the destination address from the data package; and
      an output interface for communicating at least the print data and the authorization password to the destination address; and an administration server n communication with the resource registry for providing controlled access to the resource records.

3. The system according to claim 2, wherein the destination address includes a pseudo-name for identifying a group of the network printing devices to facllitate communication between the network terminal and the group of the network printing devices.

4. The system according to claim 2, wherein the destination address identifies the network address for the network printing device.

5. The system according to claim 2 further comprising a print server coupled to the network printing device, such that the destination address identifies the address of the print server.

6. The system according to claim 5 further comprising the print server configured to confirm validity of the authorization password before forwarding said print data to the network printing device.

7. The system according to claim 2 further comprising the network printing device having the user access level definition associated therewith, a user access level definition defining a type of authorized access allowed to the network printing device, the authorized access type including one or both of either a per-user or per-group basis.

8. The system according to claim 7 further comprising storage having resource records including the user access level definition for the network printing device.

9. The system of claim 7, wherein the authorization password is included in the user access level definition.

10. The system according to claim 8, wherein the user access level definition is updatabte.

11. The system according to claim 10 further comprising the administrator server configured for updating the user access level definition in the resource records on behalf of the network printing device.

12. The system according to claim 6 further comprising the polling server configured for sending a notification to the network terminal associated with the data package when the print data as successfully transmitted to the network printing device after validation of the authorization password.

13. The system according to claim 4, wherein the network printing device is selected from the group comprising: a printer; and a facsimile machine.

14. A method for facilitating communication of a data package via a polling sewer between a network terminal and a network printing device over a network, the data package configured for authorized data processing by the network printing device, the method comprising the acts of:
   providing controlled access to resource records of a resource registry in communication with an administration server;
   defining at least a user access level for each said network printing device in at least one of the resource records of the resource registry;
   sending a poll request to a proxy server across a firewall;
   receiving the data package in response to the poll request, the data package including print data for processing by the network printing device, an authorization password associated with the network printing device and the print data, and a destination address for directing the data package over the network, the authorization password for allowing access of the print data by the network printing device;
   extracting the destination address from the data package; and
   communicating at least the print data and the authorization password to the extracted destination address.

15. The method according to claim 14 further comprising the act of confirming the validity of the authorization password before forwarding said print data to the network printing device.

16. The method according to claim 14, wherein the authorized user access level definition is associated with the network printing device, the user access level definition configured for defining a type of authorized access allowed to the network printing device, the authorized access type including one or both of either a per-user or per-group basis.

17. The method according to claim 16, wherein the authorization password is included in the definition of the user access level.

18. The method according to claim 15 further comprising the act of notifying the network terminal associated with the data package when the print data is successfully transmitted to the network printing device after validation of the authorization password.

19. The method according to claim 14, wherein the network printing device is selected from the group comprising: a printer; and a facsimile machine.

20. The method according to claim 14 further comprising the act of specifying an archive period for the data package.

21. The method according to claim 20 further comprising the act of transmitting the archived data package to multiple printing devices.

22. The method according to claim 20 further comprising the act of periodically reviewing transmission dates and times for each archive data package sent to the printing devices.

* * * * *